United States Patent [19]

Bierman et al.

[11] Patent Number: 5,761,279
[45] Date of Patent: Jun. 2, 1998

[54] VISUAL CALLING PERSON DISPLAY

[75] Inventors: Eric Bierman, Ottawa; Ernst August Munter, Kanata, both of Canada

[73] Assignee: Northern Telecom Limited, Montreal, Canada

[21] Appl. No.: 650,502

[22] Filed: May 20, 1996

[51] Int. Cl.[6] .................................................. H04M 11/00
[52] U.S. Cl. ............................................ 379/93.23; 379/142
[58] Field of Search ............................ 379/96–100, 93, 379/94, 142, 127, 201, 199, 157, 396, 93.01, 93.14, 93.17, 93.23, 93.28; 348/14–20

[56] References Cited

U.S. PATENT DOCUMENTS

| | | | |
|---|---|---|---|
| 4,754,487 | 6/1988 | Newmuis | 382/2 |
| 4,893,328 | 1/1990 | Duran et al. | 379/96 |
| 5,046,079 | 9/1991 | Hashimoto | 348/14 |
| 5,073,927 | 12/1991 | Grube | 348/14 |
| 5,117,452 | 5/1992 | Callele et al. | 379/98 |
| 5,265,145 | 11/1993 | Lim | 379/142 |
| 5,268,963 | 12/1993 | Monroe et al. | 380/23 |
| 5,414,457 | 5/1995 | Kadowaki et al. | 379/96 |
| 5,452,346 | 9/1995 | Miyamoto | 379/142 |
| 5,533,102 | 7/1996 | Robinson et al. | 379/96 |
| 5,546,447 | 8/1996 | Skarbo et al. | 379/96 |

FOREIGN PATENT DOCUMENTS

| | | | |
|---|---|---|---|
| 0 609 019 | 8/1994 | European Pat. Off. | 348/17 |
| 2618281 | 1/1989 | France | 379/142 |

*Primary Examiner*—Wing F. Chan
*Attorney, Agent, or Firm*—Jean-Pierre Fortin

[57] ABSTRACT

A system for displaying graphic information such as a facial representation on a communications terminal. The facial representation is digitized, compressed and stored in memory at the appropriate control center of a communications network. Upon receipt of a display command the digitized data is retrieved from memory and transmitted to the called party's display terminal using modem technology.

15 Claims, 4 Drawing Sheets

VISUAL CALLING PERSON DISPLAY

FIELD OF THE INVENTION

This invention relates to communication networks such as telephone public switching networks and to systems and/or methods of displaying graphics such as the facial representation of a calling party.

BACKGROUND OF THE INVENTION

Subscribers to Custom Local Area Signaling Services (CLASS) features can select as an option, a caller line identification (CLID) service wherein the telephone number of the calling party is displayed at the time an incoming telephone call is received. The subscriber must of course have a display terminal with the capacity to receive and display the telephone number of a calling party. The terminal may also display other digits such as data and/or time of day. It is also within the capability of such telephony terminals to display alpha-numeric information such as the name of the calling party.

In such networks, the calling party identification data is stored at either the calling party's central office or at some service control point (SCP). Upon receipt of an identifier that a subscriber of the caller ID service is being called the stored data is retrieved from the memory at the calling party's central office or appropriate SCP. The information is transmitted via SS7 trunks between central offices using low bit rate modem technology over existing analog lines to the called subscriber. Conventionally, the data is transmitted during the time interval between the first and second ringing bursts. Using simple modems and allowing for sufficient guard time to permit ringing transients to dissipate it is possible to convey up to 100 bytes of data during the time interval between ringing bursts. Display phones such as Nortel's VISTA series are representative of terminals capable of providing caller ID. VISTA is a trademark of Northern Telecom Limited.

PRIOR ART

The amount of information that can be conveyed in he aforementioned 100 bytes of data will depend on the nature and compression of the data. U.S. Pat. No. 4,754,487, which issued Jun. 28, 1988 to Newmuis, discloses a processing technique for digitizing and storing information indicative of the major recognizable features of an object such as the face of a person. The patent describes a compression scheme which concentrates on the portion of the person's face containing unique identification features. This critical area in the subject patent is identified as the critical identification area (CIA) and represents a T-shaped zone covering the eyes, nose and mouth of the person being identified. Other regions of the person's face such as forehead, hair line, etc., contain fewer uniquely identifiable features and can be captured in lesser detail. Using this compression technique, a representation of a person's face can be digitized and stored on, for example, the magnetic stripe on a credit card which makes it possible for the bearer of the card to be identified upon presentation of the card in connection with a financial transaction. In this patent approximately 1K bytes of data are used. The party making the identification must, of course, have the necessary equipment to convert and display the digitized data.

U.S. Pat. No. 5,268,963, which issued Dec.7, 1993 to Monroe et al. also describes a system and method for encoding personalized identification for storage on memory storage devices. The '963 patent relates to the acquisition, digitization and compression of a photographic-type image on a memory device wherein the data contains randomly distributed unique serialized information used for verifying authenticity.

SUMMARY OF THE INVENTION

The present invention seeks to combine the digitization/compression process and the caller identification feature to provide a system wherein the facial likeness of the originator of a communications connection is displayed at the terminal of the communications recipient. In a preferred embodiment the invention relates to the provision of a facial image of a calling party on the display of a called party's display telephone.

Therefore in accordance with a first aspect of the present invention there is provided a system for providing graphics to a user of a telecommunications network. The system has a communications terminal with display means for presenting the graphics. A control centre has communications switching equipment to route communications from a communications originator to the user of the communications terminal. The control centre also has memory means to store the graphics in a digitized format and to retrieve the digitized data from the memory in response to a request from the communications originator. Transmission means link the control centre to the communications terminal, the terminal having means to convert the digitized data and to display the same to a user of the terminal.

In a preferred embodiment, the telecommunications network is a telephone system utilizing a display telephone in which the graphics is a facial representation of the calling party. In a further embodiment the graphics is a logo or other distinguishing information which identifies the caller or a caller's product or service.

In accordance with a second aspect of the invention, there is provided a method of displaying graphics to the user of a communications network. The method comprises the steps of (a) digitizing the graphics to be displayed, (b) storing the digitized data in memory at a control centre, (c) retrieving the digitized data from the memory in response to a command from an originator of a communication, (d) downloading the digitized data to a terminal at the premise of a recipient cf the communications, and (e) displaying the graphics on a display on the terminal.

BRIEF DESCRIPTION OF THE DRAWINGS

The invention will now be described in greater detail with reference to the attached drawings wherein.

DETAILED DESCRIPTION OF THE INVENTION

Figure 1:
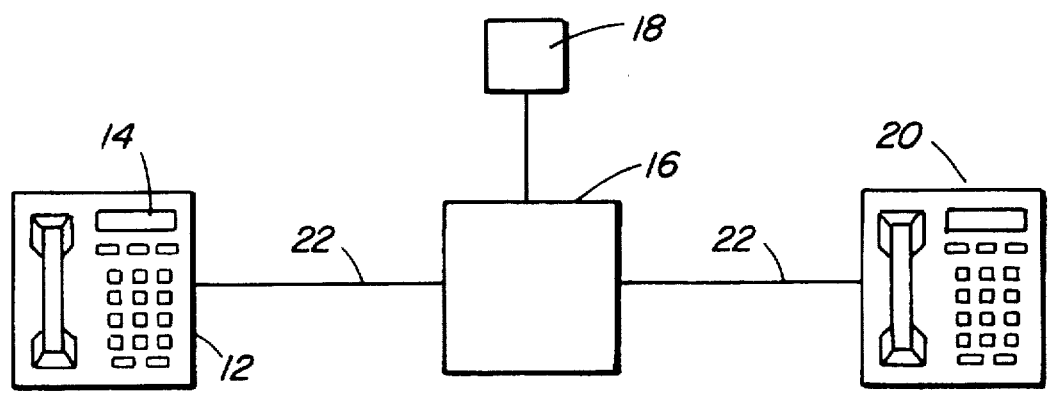
FIG. 1 is a block diagram of a basic system.

As shown in FIG. 1, the system includes terminals 12.20 such as telephones having a display 14. The display in a preferred embodiment is a high resolution LCD having backlighting. The exact format of the display is not critical as long as the area and resolution is sufficient to display the key elements of a facial representation. The type of displays used on present display phones may be adequate or it may be necessary to provide a display with more capabilities, if greater detail is required.

Although a display phone is contemplated in FIG. 1, it is to be understood that other display means such as a computer monitor may be incorporated in the system, particularly if the form of communications involved is electronic mail.

The system as illustrated in FIG. 1 includes a control centre 16 which includes switching equipment necessary to connect telecommunication from an originating party to a receiving party via lines 22. Switching equipment designed to perform this function is well known and is not described in detail herein. Such equipment might be, for example, a PBX for strictly local communications.

The switching equipment of the present invention also has provision for storing a digitized representation of the facial features of a subscriber to the service. The subscriber makes available to the service provider a photograph or other graphic representation which is to be displayed. The service provider digitizes the photograph utilizing compression techniques such as those described in the aforementioned U.S. patents. By these techniques, in which only the critical identification areas are recorded in detail, a recognizable representation of a subscriber's face can be produced utilizing approximately 40 bytes. This data is stored in a memory store 18 at the control centre 16 for access by the switching network in the same way as a calling party's number or name is accessed by a CLID feature.

Figure 2:
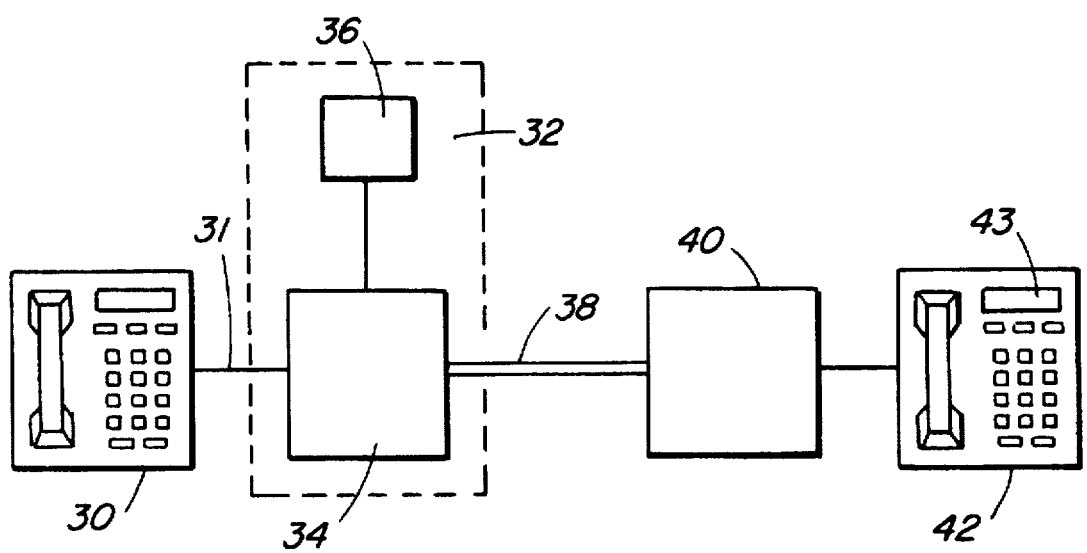
FIG. 2 is a block diagram of an embodiment of the system applicable to the public switched telephone network.

A preferred embodiment of the invention pertains to the public switched telephone network wherein the terminals are display telephones and the control centres are comprised of central offices associated with the public network. FIG. 2 is a block diagram representing such a system. In FIG. 2, the calling party's telephone 30 is connected to the local central office 32 via line 31. Central office 32 has, in addition to a switch 34, memory means 36 in which is stored digitized data representing the facial representation of all the subscribers to the service which are connected to the local office 32. Central office 32 is connected via CCS-7 trunks such as trunk 38 to a plurality of other central offices as is known in the art. In FIG. 2 one of these other offices is the local or central office 40 to which the called party's terminal 42 is connected. Thus, the calling party initiates a call via terminal 30 to the called party on terminal 42. The call is routed via switching means 34 in central office 32 to central office 40 whereat it is determined that called party's terminal 42 has means to display the facial representation of the calling party. The facial representation in digitized form is retrieved from memory means 36 and routed via trunk 38 to central office 40 and terminal 42. At terminal 42 the digitized data is processed and displayed on the display 43 as a facial representation of the calling party. Preferably this data is presented with other calling line identification information such as telephone number and/or calling party's name between the first and second ringing bursts.

Figure 3:
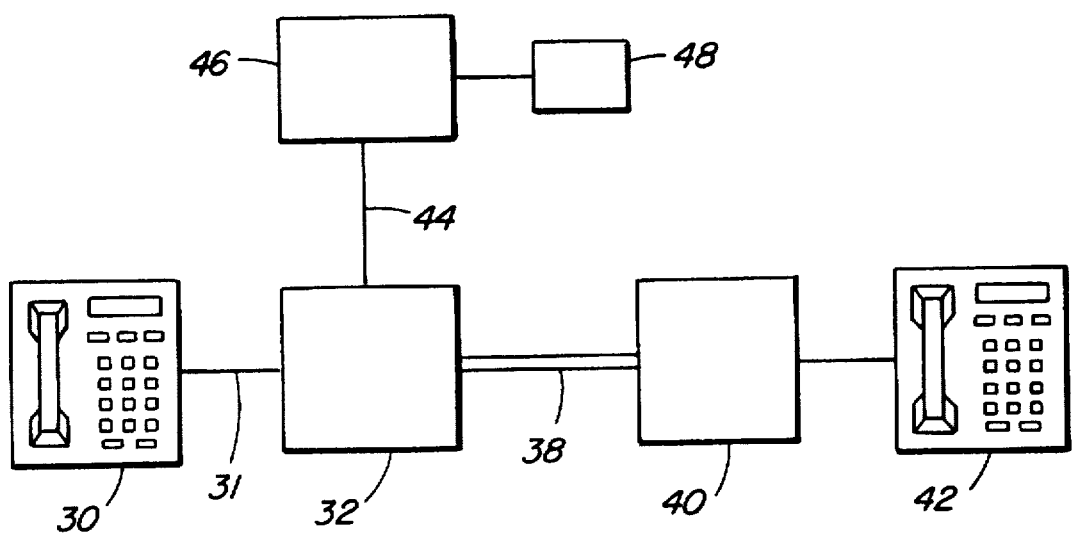
FIG. 3 is a block diagram of an alternative to the system of FIG. 2.

FIG. 3 shows a variation on the system illustrated in FIG. 2. In this embodiment the calling party's local office 32 is connected via trunk 44 to service control point 46 which includes digitized data storage means 48. The digitized data is retrieved from storage as required in response to a call from the calling party's terminal 30.

It is to be understood that the calling party can, via terminal 30, signal the switching network not to transmit the facial representation to the called party if it is deemed inappropriate to do so when completing the telephone connection. Terminal 30 will also preferably be a display telephone although other terminals such as a computer are anticipated by this invention.

It is also to be understood that a subscriber number may have more than one individual placing calls to a called number. In this case, the subscriber could store in the memory at the Central Office a digitized facial representation of each of the members using the calling party number. Each member then would have a code or indicator to select which of the facial representations in memory was to be downloaded to the called party's terminal.

Figure 4:
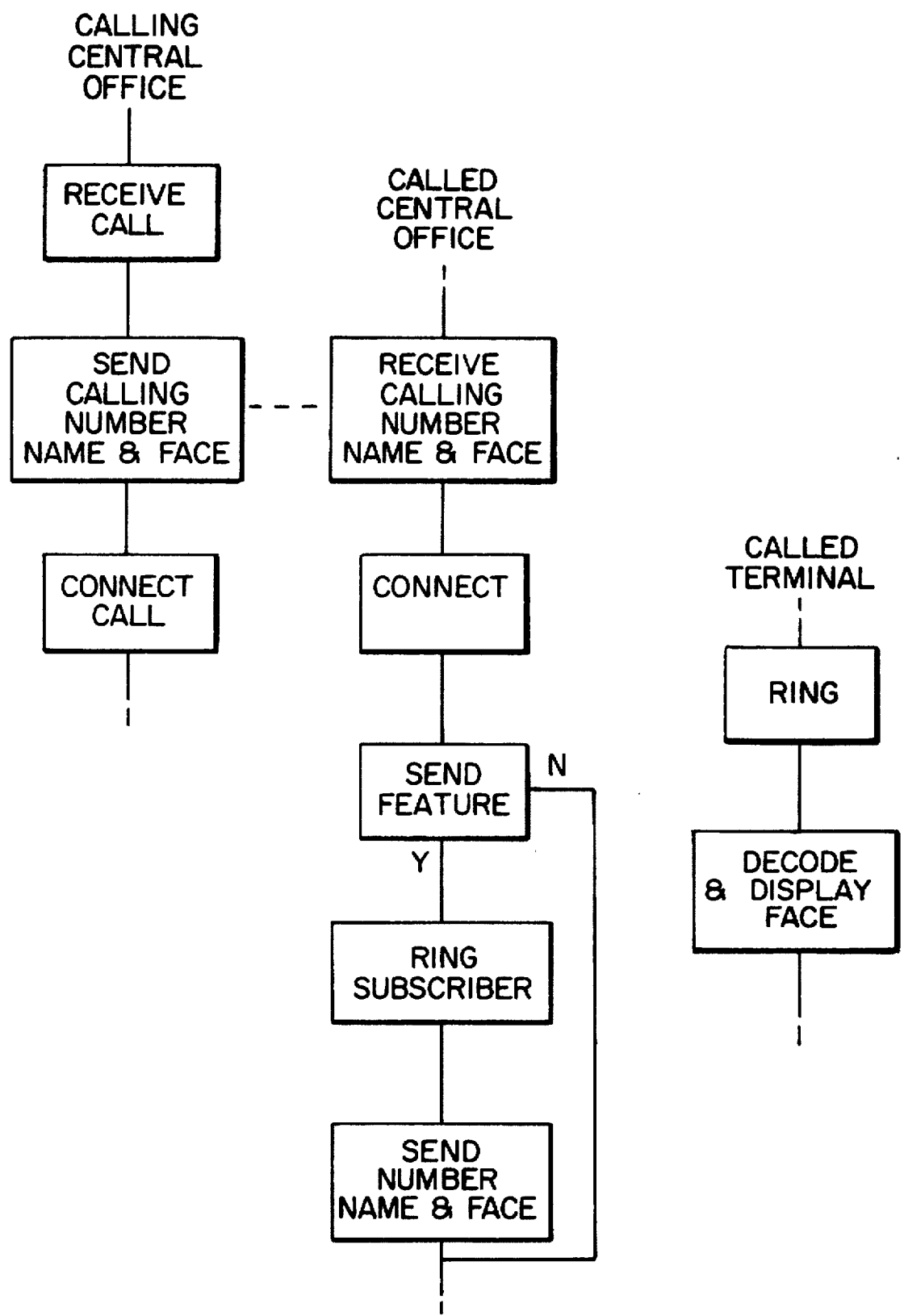
FIG. 4 is a flow chart illustrating a program sequence.

A flow chart of a processing sequence is shown in FIG. 4. As illustrated, a call initiated from the calling party's terminal is received at the calling party's central office by dialing or voice activation. It is to be assumed that the calling party is a subscriber to the CLASS service and the caller line identification feature. The calling party's central office retrieves at least digitized data of the calling party's facial representation and transmits this data together with the call via the trunk line to the called party's central office. At the called party's central office it is determined as to whether the called party is also a subscriber to the CLID function. If not, the call is connected to the called party's terminal without CLID. If the called party is a subscriber the first ringing burst is sent to the called party's terminal, followed immediately by the digitized data representing the calling party's face. The digitized and compressed data is transmitted using a low bit rate modem technology over the existing analog line. At the terminal the digitized data is decoded and displayed on the called party's display terminal. As shown in FIG. 4, the calling party's telephone number and name is optionally sent to the called party's terminal together with the facial representation. As previously indicated, the facial representation of a person can be digitized by compression techniques utilizing approximately 40 bytes. This leaves approximately 60 bytes of the potentially 100 bytes for name and number data to be transmitted between first and second ringing bursts.

Figure 5:
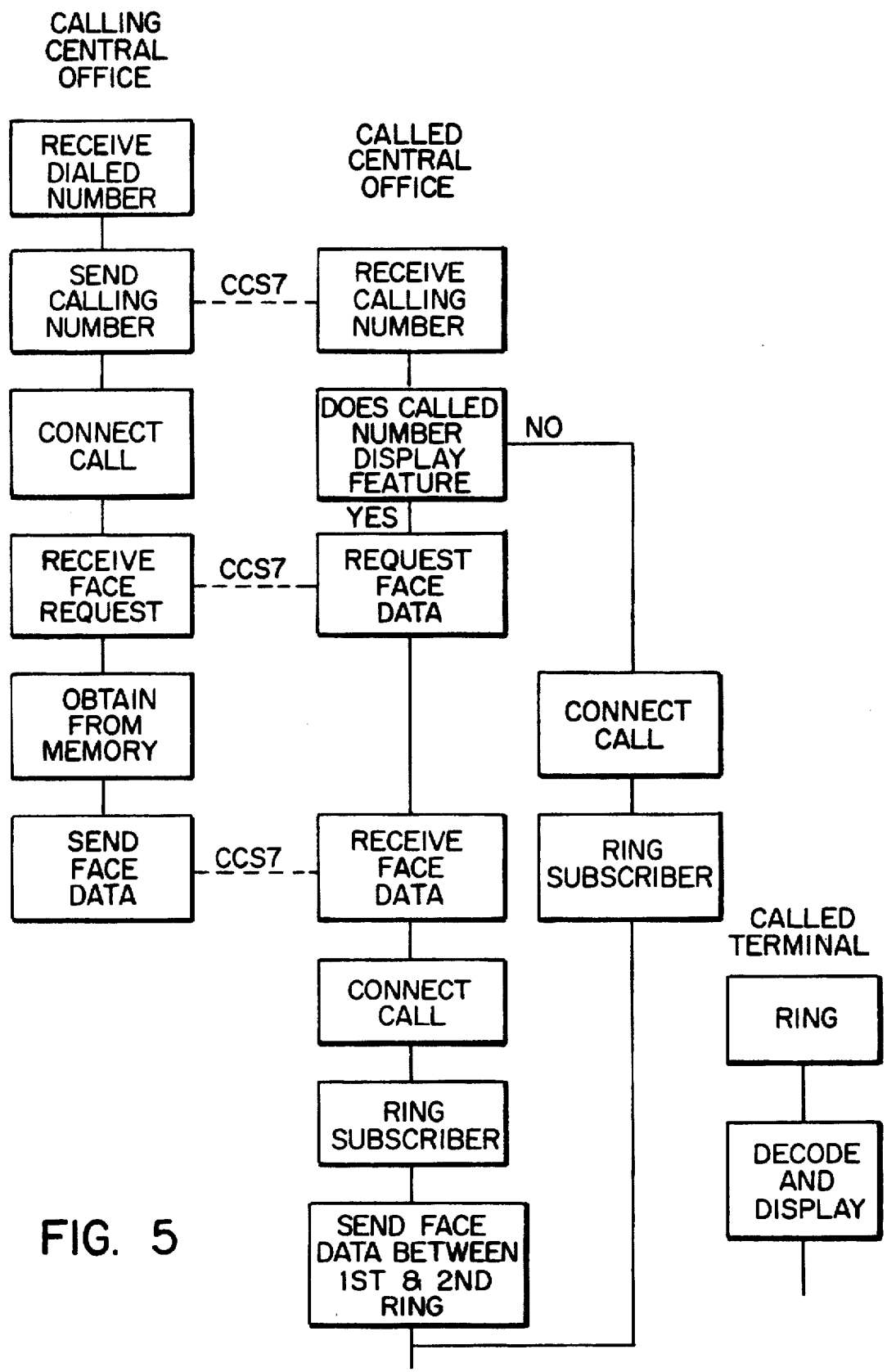
FIG. 5 is a flow chart of al alternative program sequence.

FIG. 5 is a flow chart showing the sequences required to carry out the more complex function of determining which of the features, i.e., name, number and/or face, are to be displayed at the called party's terminal.

Thus, the invention takes the current practice of displaying a calling party's name and phone number to the next step of displaying the calling party's face as well.

Although an examplary embodiment of this invention has been described, it will be apparent to one skilled in the art that alternatives are possible. The actual scope of the invention, however, is to be limited only by the claims appended hereto.

We claim:

1. A system for providing augmented CLID (Caller Identification Data) data to a called party who is a subscriber to a related CLASS feature over a public telephone switching network comprising:

a telephone terminal at said called party's location, said telephone terminal having decoding and displaying means capable of decoding and displaying graphics;

a terminal at the location of a calling party for originating a call to said subscriber;

a central office associated with said calling party's terminal, said calling party's central office having switch means to route said call therethrough;

memory means at said calling party's central office for storing said augmented CLID data, said data comprising a plurality of graphics in digitized form, each of the graphics being directly associated with the identity of a respective subscriber;

retrieval means associated with said memory means for retrieving one of said digitized graphics associated with the calling party from said memory means and for routing said graphics with said call;

a called party's central office associated with said called party for receiving said call and digitized graphics from said calling party's central office and for selectively routing said call and digitized graphics to said called party; and transmission means communicatively connecting said calling party's terminal to said calling party's central office, from said calling party's central office to said called party's central office, and from said called party's central office to said called party's terminal.

2. A system as defined in claim 1, said graphics being the representation of the calling party's face.

3. A system as defined in claim 1, said digitized graphics being compressed to a data stream of about 40 bytes.

4. A system as defined in claim 1, said graphics being the representation of a logo representing the identity of a subscriber.

5. A method for providing augmented CLID (Caller Identification Data) data to a called party who is a subscriber to a CLASS (Custom Local Area Signalling Service) feature over a telephone network comprising the steps of:

at a first telephone switch associated with a calling party, storing in a memory means, augmented CLID data comprising graphics in digitized form, the graphics representing the identity of the calling party;

on the origination of a call by the calling party to the called party, routing the call together with the digitized graphics data associated with the calling party to a second telephone switch associated with the called party and thence to a called party terminal; and at the called party terminal, decoding and displaying the digitized graphics data to provide the called party with a visual representation of the identity of the calling party.

6. A method as defined in claim 5 wherein the digitized graphics data is stored and routed as digitized compressed data.

7. A method as defined in claim 6, wherein said digitized compressed data is routed to said called party's terminal between a first and second ringing burst.

8. A method as defined in claim 7, wherein said graphics is a facial representation of said calling party.

9. A method as defined in claim 8, wherein said calling party's name is displayed together with the facial representation of the calling party.

10. A method as defined in claim 8, wherein said calling party's telephone number is displayed on said called party's terminal together with said calling party's facial representation.

11. A method as defined in claim 10, wherein said calling party's name is displayed together with said calling party's facial representation and telephone number.

12. A method as defined in claim 7 wherein said graphics is a logo representing the identity of a calling party terminal.

13. A method as defined in claim 12 wherein the calling party's telephone number is displayed on the called party's terminal together with the logo identifying the calling party.

14. A method as defined in claim 13 wherein the calling party's name is displayed together with the calling party's logo and telephone number.

15. A method as defined in claim 12 wherein the calling party's name is displayed together with the logo identifying the calling party.

* * * * *